Oct. 14, 1952 C. W. LEDIG 2,613,787
TWO-HAND SAFETY CONTROL FOR POWER MACHINERY
Filed Aug. 26, 1948 3 Sheets-Sheet 2

INVENTOR.
CHARLES W. LEDIG
BY Martin J. Finnegan
ATTORNEY

Oct. 14, 1952 C. W. LEDIG 2,613,787
TWO-HAND SAFETY CONTROL FOR POWER MACHINERY
Filed Aug. 26, 1948 3 Sheets-Sheet 3

INVENTOR.
CHARLES W. LEDIG
BY
Martin J. Finnegan
ATTORNEY

Patented Oct. 14, 1952

2,613,787

UNITED STATES PATENT OFFICE 2,613,787

TWO-HAND SAFETY CONTROL FOR POWER MACHINERY

Charles W. Ledig, Cranford, N. J., assignor, by mesne assignments, to National Pneumatic Co., Inc., Boston, Mass., a corporation of Delaware Application August 26, 1948, Serial No. 46,193

5 Claims. (Cl. 192—131)

This invention relates to power machinery, and particularly to machinery, such as presses, wherein a pressing or punching tool or die moves into contact with a piece of material to be processed, and then withdraws to afford the attendant an opportunity to re-position the some or another piece of material to be engaged on the next operating stroke of the machine.

Machines of this general description usually include a clutch that is normally held in a disconnecting position, so that the drive shaft is normally prevented from imparting reciprocatory motion to the work head carrying the punching tool or other work element. To engage the clutch it is necessary to operate a releasing element, commonly referred to as a "clutch trip." To render the machine non-repeating pneumatic power may be relied upon to operate the clutch trip, in which case the release of the air pressure from one side of the pneumatic cylinder permits a compressed spring to expand and thereby exert sufficient power to cause a re-locking of the clutch in the disengaged position.

It is agreed, by all persons concerned with preventing injuries to operators of machines of this character, that a second, or "repeat" stroke of the machine should be possible only after both hands of the operator have been (1) removed from the control devices, and (2) re-applied thereto, thus insuring that both hands are safely out of the path of motion of the reciprocating parts of the machine before such second stroke occurs. Various devices have been suggested in an effort to attain this desirable objective in the simplest and most dependable manner possible; and the present invention discloses what appears to be a meritorious solution of the problem.

It is accordingly an object of this invention to provide an effective, positive method of control of the operation of a power press or analogous power machine.

A second object is to provide an improved system of fluid pressure responsive devices for controlling both the locking and the release of the clutch trip of a power press or comparable apparatus.

A third object is to provide a fluid pressure locking arrangement to prevent a second cycle of operation of the clutch trip prior to (a) release of two manually operable elements, and (b) re-operation of said two elements, for which re-operation both hands of the attendant are called into play.

A fourth object of the invention is to provide a control valve of novel construction, which novel construction contributes to the establishment of the fluid pressure lock above referred to, as well as adapting the valve for application to other uses.

Other objects and features of the invention will be understood upon reading of the following description of the embodiment of the invention illustrated in the accompanying drawings; it being understood, of course, that other embodiments are embraced within the scope of the appended claims.

In the drawings, wherein component parts are designated by like reference characters in the several views:

Fig. 3 is a view of the operating connections to the machine being controlled;

Figure 1:
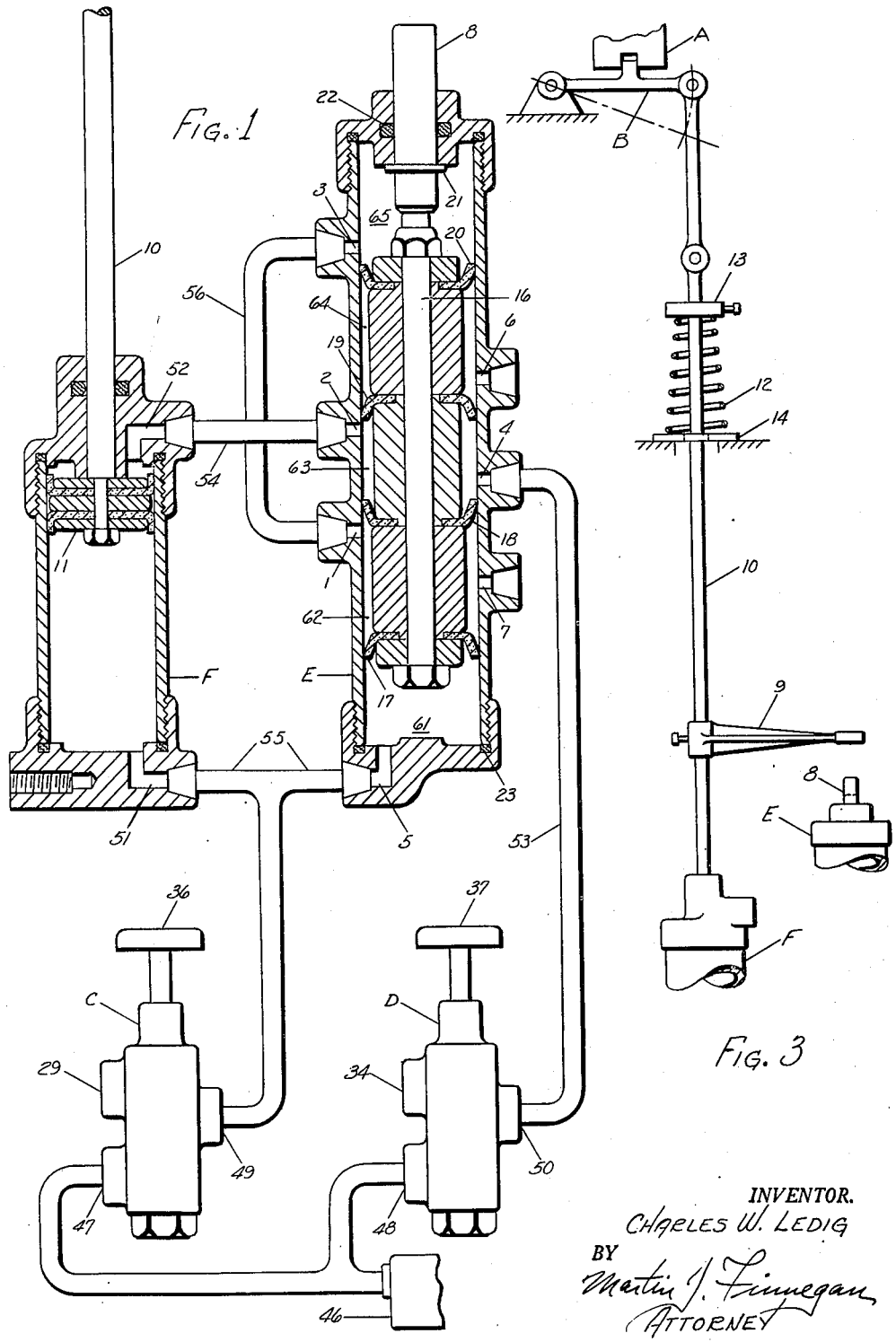
Fig. 1 is a diagrammatic showing of the pneumatic elements, connections, and associated structures representing the disclosed embodiment of the invention; certain of the moving parts being shown in the relative positions occupied before the operating cycle is initiated.
Figure 2:
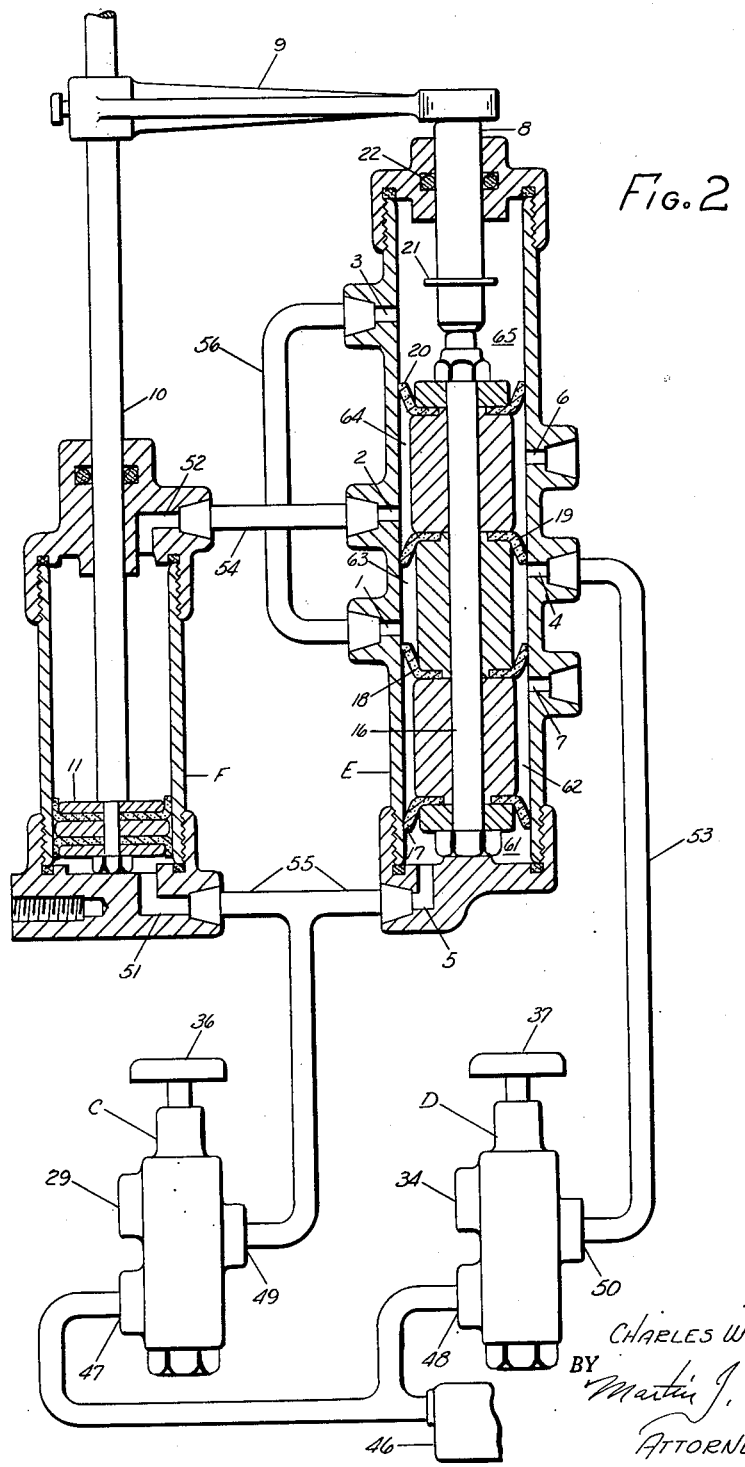
Fig. 2 is a similar diagram, but with these moving parts in the relative positions occupied at a subsequent stage in the cycle.

Referring first to Fig. 3, letter A designates the clutch of a power press, and B the clutch trip operated by the fluid pressure applied to cylinder F, under the control of manual valves C and D, and automatic valve E. Valve E, as shown in Figs. 1 and 2, has seven ports, designated by numerals 1 to 7, and it also includes a projecting valve pin 8 adapted to be operated in one direction by an arm 9 extending laterally from the clutch trip rod 10 whose upper end connects with the clutch trip B and whose lower end is secured to the piston 11 of cylinder F. A spring 12 has one end bearing against a collar 13 secured to rod 10, the other end of the spring resting on a fixed bracket 14.

As shown in Figs. 1 and 2, the core of valve E is a built-up assembly of cylindrical pieces held together by a spindle 16, one end of which abuts the projecting pin 8; there being a plurality of leather cups assembled with said cylindrical piece. These cups 17, 18, 19, 20 divide the valve into five compartments (61 to 65) controlling communication from one to another, by way of the ports, numbered 1 to 7, and thus control movement of the valve core, as well as the movement of piston 11 of cylinder F. A collar 21 on pin 8 limits outward movement of the pin, and thereby limits movement of spindle 16 as well; valve cap is grooved to receive sealing ring 22. A supplementary seal 23 protects the opposite end of the valve housing.

Figures 4, 5:
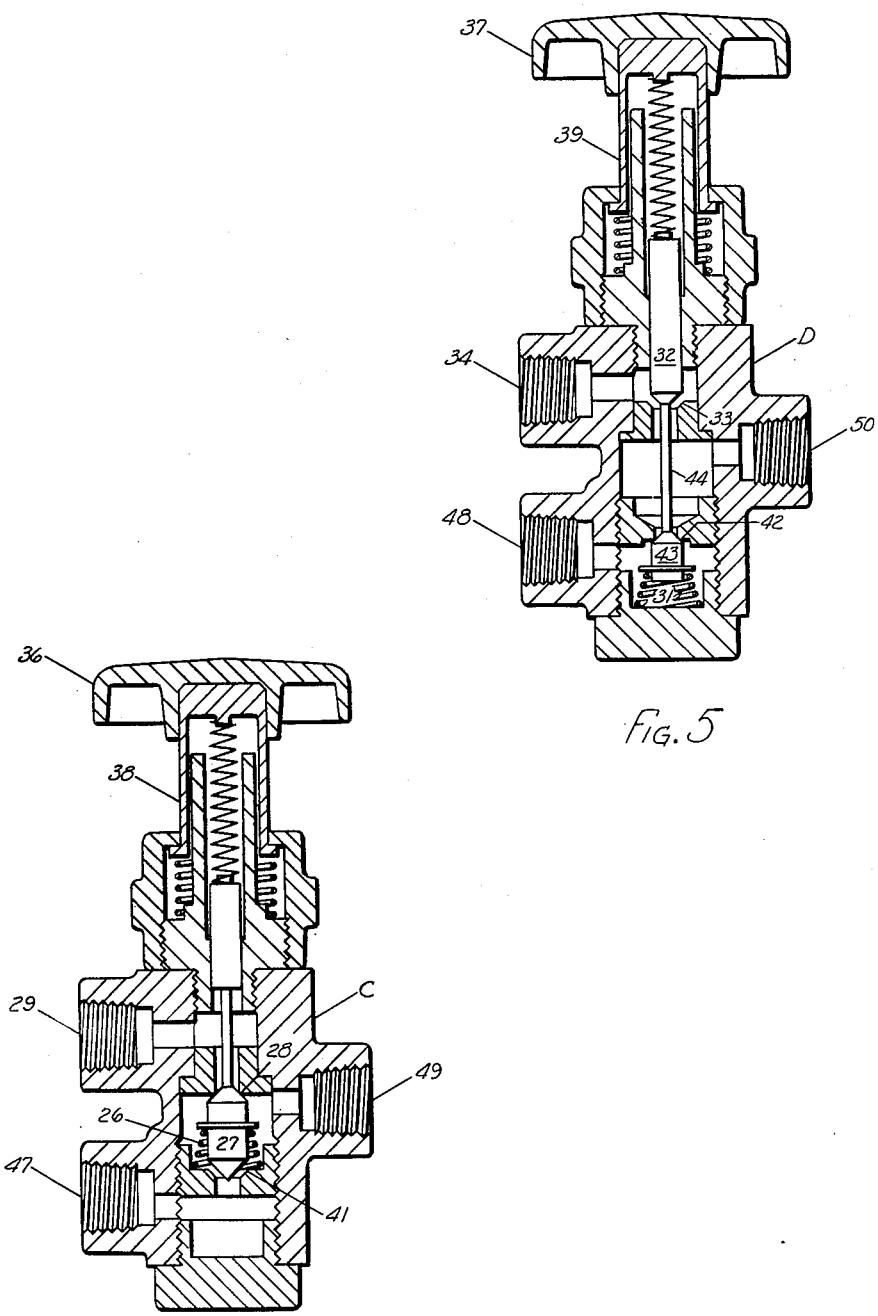
Figs. 4 and 5 are sectional views of the two manually operable valves, C and D respectively.

As shown in Figures 4 and 5, the valves C and D are of similar construction, except that spring 26 of valve C seats valve core 27 against seat 28, to close off exhaust passage 29, while spring 31 of valve D lifts valve core 32 from seat 33, to open the exhaust passage 34 to the atmosphere. Depression, manually, of the valve cores, to reverse the conditions just described, is made possible by attaching knobs or push-buttons 36, 37 to the upper ends of the core extensions 38, 39 respectively. Valve C has a second valve seat, shown at 41, and valve D has a second valve seat shown at 42; the seats 41 and 42 being engaged by the cores 27 and 43, respectively, of the two valves. A thin spindle 44 intervenes between cores 32 and 43 of valve D, to impart thrust in both directions. The pressure fluid supply line from source 46 (Fig. 1) connects with both valves C and D, by way of ports 47, 48, respectively, and ports 49 and 50 of the respective valves connect with ports 51 and 52, respectively, of cylinder F, the latter by way of ports 4 and 2 of the pilot valve E, and conduits 53 and 54. A conduit 55 connects cylinder port 51 with port 5 of the pilot valve, and a conduit 56 (which may run internally of the valve E housing, that is, longitudinally along one lateral wall) connects valve ports 1 and 3 of the pilot valve.

As illustrated in Fig. 1, the piston 11 is at the upper extremity of its path of travel, upper port 52 is connected to the atmosphere (by way of conduits 54 and 53, ports 2 and 4 of valve E, and exhaust passage of valve D) and lower cylinder port 51 is connected to the source of pressure by way of ports 47 and 49 of valve C. Hence the chamber below the piston 11 is supplied with fluid under pressure. The same is true of compartment 61 (Fig. 1) and therefore the valve core assembly, along with stem 8, is in its uppermost postion. Also, spring 12 is fully expanded.

With the parts in the relationships just described (and as illustrated in Fig. 1) let it be supposed that the machine attendant depresses the buttons 36 and 37, thereby reversing the settings of both valves C and D. The fluid under piston 11 is now exhausted to the atmosphere, by way of port 49 and exhaust passage 29 (Fig. 4) of valve C. By the same path the fluid in compartment 61 of valve E is exhausted to the atmosphere. Simultaneously, fluid from the source is supplied to the cylinder port 52 by way of valve D, conduit 53, and compartment 63 of valve E. In entering compartment 63, this pressure supply acts oppositely on the cup elements 18 and 19, thus balancing the forces exerted on the valve core assembly, wherefore said core assembly tends to remain in the upper position shown in Fig. 1, even though in the meantime the pressure in compartment 61 is being released to the atmosphere.

The fluid entering cylinder F, through port 52, causes piston 11 to descend, the fluid beneath the piston having been released, as above noted. Descent of piston 11 operates clutch trip B, permitting establishment of driving connections to the power tool by reason of this engagement of the clutch. As the piston descends spring 12 is compressed toward bracket 14, and in the final portion of the descent striker arm 9 thrusts inward the stem 8 of valve E, thereby shifting the valve core assembly to the lower position, as shown in Fig. 2. This shift of the valve core assembly causes (a) the return of piston 11 to its upper position, and (b) the setting up of a fluid pressure locking condition which operates to hold said piston 11 in said upper position, wherefore there can be no second descent thereof (hence no second stroke on the part of the power tool) until the attendant goes through the successive steps of (1) releasing both valve buttons 36, 37, and (2) re-depressing them—in the execution of which latter manipulation he must necessarily remove his hands from the vicinity of the power tool.

The return of the piston 11 to its upper position, as described in the preceding paragraph, is brought about by the expansion of spring 12, and such expansion is made possible by the release of pressure from above the piston, by way of conduit 54, compartment 64, and exhaust port 6 of valve E; the said compartment 64 having been moved into alignment with conduit 54 (and valve port 2) by the downward shift of the valve core assembly, as above described. The fluid pressure lock, whereby piston 11 is prevented from re-descending, results from the flow of pressure fluid to compartment 65 of valve E, whereby a fluid differential is established in a direction to hold the valve core in its lower (Fig. 2) position and thus to hold the upper chamber of cylinder F open to exhaust port 6 of valve E. (Obviously, there can be no re-descent of piston 11 so long as the space above the piston remains open to the atmosphere in this fashion.)

The flow of pressure fluid to compartment 65, just described, is by way of conduit 53, compartment 63, port 1, and conduit 56, leading directly to compartment 65. The resultant downward pressure on cups 20 and 18, with upward pressure on cup 19 only (compartment 61 being open to the atmosphere, through valve C) establishes a fluid pressure differential in the downward direction, thus locking the valve core assembly in its lower position, wherein the upper chamber of cylinder F is open to atmosphere through conduit 54, compartment 64, and exhaust port 6, as above noted.

To restore the valve core assembly to a position of readiness for a second cycle of operation, it is necessary for the attendant to remove manual pressure from valves C and D, whereupon the springs of said valves C and D produce a reversal thereof, thus connecting compartment 61 of valve E to the pressure supply (by way of valve C and conduit 55) and exhausting compartments 63 and 65 to the atmosphere, by way of conduit 53 and valve D. The resultant upwardly directed differential pressure on the valve core assembly of valve E restores the valve to its upper (Fig. 1) position. At the same time pressure fluid enters cylinder F, below piston 11, but this is of no functional effect, at this stage, as the piston 11 has previously assumed its upper position, where it will remain until the valves C and D are again manually operated, to initiate a second cycle.

What I claim is:

1. In a safety control system for power machinery, a cylinder having a piston movable therein, means for admitting pressure fluid to move said piston in a direction to initiate a single working stroke of said power machinery, and means responsive to such piston movement to exhaust pressure fluid from said cylinder, to return said piston to its initial position, said last named means including a control valve interposed between said cylinder and a source of pressure, said control valve including a second cylinder and a flow controlling element reciprocating in said cylinder, means movable with said piston for moving said flow controlling element in one direction, and means responsive to the operation of said last named means to establish a fluid pressure balance within said second cylinder, which fluid pressure balance operates to lock said flow control element in a position preventing further application of actuating fluid pressure to said piston following the return of said piston to said initial position.

2. Apparatus as defined in claim 1, including manually operable means for releasing said fluid pressure balance condition.

3. Apparatus as defined in claim 1, wherein said balance establishing means includes a plurality of surfaces on said flow control member, and means responsive to movement of said flow control member to apply over-balancing pressures to said surfaces and thereby prevent further movement of said flow.

4. Apparatus as defined in claim 3, including a pair of hand valves, one biased to connect said pressure fluid source with one of the ports of said first named cylinder, and the other biased to connect the other port of said first named cylinder to exhaust, by way of said flow control means.

5. In a safety control system for power machinery, means for preventing two successive power strokes in response to a single manual power applying operation, comprising a power transmitting clutch, means for controlling the engagement and disengagement of said clutch, said controlling means comprising a fluid pressure operated piston and mechanical connections between said piston and said clutch, means including a source of fluid pressure and a series of valves for controlling application of fluid pressure to said piston, and means for interrelating said controlling means in such a manner that simultaneously with the engaging movement of said clutch there is initiated a sequence of actions producing, first, a disengagement of said clutch, and secondly, a locking thereof in the disengaged position, from which position it can be released only by a new manual power applying operation, said interrelating means comprising fluid pressure connections for establishing a fluid pressure balance preventing a second operating stroke of said piston until after all of said valves have been allowed to return to their initial positions.

CHARLES W. LEDIG.

REFERENCES CITED

The following references are of record in the file of this patent:

UNITED STATES PATENTS

| Number | Name | Date |
|---|---|---|
| 1,526,025 | Street | Feb. 10, 1925 |
| 1,711,079 | Bath | Apr. 30, 1929 |
| 1,829,184 | Daly | Oct. 27, 1931 |
| 1,929,484 | Davis | Oct. 10, 1933 |
| 2,267,415 | Myers | Dec. 23, 1941 |
| 2,423,482 | Chochol | July 8, 1947 |